United States Patent
Ueda

(10) Patent No.: US 11,507,089 B2
(45) Date of Patent: *Nov. 22, 2022

(54) VEHICLE CONTROL SYSTEM

(71) Applicant: Toyota Jidosha Kabushiki Kaisha, Toyota (JP)

(72) Inventor: Kazuhiko Ueda, Chofu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 261 days.

This patent is subject to a terminal disclaimer.

(21) Appl. No.: 16/680,807

(22) Filed: Nov. 12, 2019

(65) Prior Publication Data

US 2020/0150658 A1  May 14, 2020

(30) Foreign Application Priority Data

Nov. 14, 2018  (JP) .............................. JP2018-213867

(51) Int. Cl.
*G05D 1/00* (2006.01)
*B60Q 1/08* (2006.01)
(Continued)

(52) U.S. Cl.
CPC .............. *G05D 1/0088* (2013.01); *B60Q 1/08* (2013.01); *B60S 1/08* (2013.01); *B60W 30/18* (2013.01);
(Continued)

(58) Field of Classification Search
CPC .......... G05D 1/0088; B60Q 1/08; B60Q 1/34; B60Q 1/346; B60Q 2300/20;
(Continued)

(56) References Cited

U.S. PATENT DOCUMENTS 6,947,576 B2   9/2005  Stam et al.
7,653,215 B2   1/2010  Stam
                      (Continued)

FOREIGN PATENT DOCUMENTS

JP   2006-73013 A   3/2006
JP   2009-151522 A  7/2009
                (Continued)

OTHER PUBLICATIONS

Non-Final Office Action dated May 24, 2022, for related U.S. Appl. No. 16/680,944, filed Nov. 12, 2019.
(Continued)

*Primary Examiner* — Yuen Wong
(74) *Attorney, Agent, or Firm* — Dinsmore & Shohl LLP

(57) ABSTRACT

The vehicle includes an operation switch for manually operating the operation state of the accessories. The vehicle control system includes a first controller that performs an evacuation traveling in response to a decrease in the driver's consciousness level, and a second controller that controls an operation state of the accessories based on a request from the first controller or operation information of the operation switch. The first controller is configured to transmit, to the second controller, a specific operation rejection request for performing a specific operation rejection process of rejecting the control of the accessories based on the specific operation of the operation switch in response to a decrease in the driver's consciousness level. The second controller is configured to perform the specific operation rejection process when the specific operation rejection request is received from the first controller.

9 Claims, 15 Drawing Sheets

(51) Int. Cl.
  *B60W 30/18* (2012.01)
  *B60W 40/08* (2012.01)
  *B60S 1/08* (2006.01)
  *B60W 50/08* (2020.01)
  *B60Q 1/34* (2006.01)
  *B60W 50/00* (2006.01)
(52) U.S. Cl.
  CPC ............ *B60W 40/08* (2013.01); *B60W 50/08* (2013.01); *B60Q 1/34* (2013.01); *B60W 2040/0818* (2013.01); *B60W 2050/0071* (2013.01); *B60W 2540/26* (2013.01)
(58) Field of Classification Search
  CPC ........ B60Q 1/1423; B60S 1/08; B60W 30/18; B60W 40/08; B60W 50/08; B60W 2040/0818; B60W 2050/0071; B60W 2540/26
  See application file for complete search history.

(56) References Cited

U.S. PATENT DOCUMENTS

| | | |
|---|---|---|
| 3,120,652 A1 | 2/2012 | Bechtel et al. |
| 9,410,491 B2 | 8/2016 | Chang |
| 11,435,746 | 9/2022 | Ebrahimi Afrouzi et al. |
| 2003/0138132 A1 | 7/2003 | Stam et al. |
| 2004/0218401 A1 | 11/2004 | Okubo et al. |
| 2005/0278093 A1 | 12/2005 | Kameyama |
| 2006/0177098 A1 | 8/2006 | Stam |
| 2009/0010494 A1 | 1/2009 | Bechtel et al. |
| 2012/0116632 A1 | 5/2012 | Bechtel et al. |
| 2013/0345935 A1 | 12/2013 | Chang |
| 2014/0156133 A1 | 6/2014 | Cullinane et al. |
| 2015/0002015 A1 | 1/2015 | Hayakawa et al. |
| 2015/0073621 A1 | 3/2015 | Kida |
| 2017/0235306 A1* | 8/2017 | Seki ....................... B60K 28/02 701/23 |
| 2017/0322558 A1 | 11/2017 | Teshima et al. |
| 2017/0332010 A1 | 11/2017 | Asakura et al. |
| 2018/0043904 A1 | 2/2018 | Cullinane et al. |
| 2018/0111628 A1 | 4/2018 | Tamagaki et al. |
| 2018/0181128 A1 | 6/2018 | Urano |
| 2018/0334173 A1 | 11/2018 | Cullinane et al. |
| 2019/0039617 A1 | 2/2019 | Miura et al. |
| 2020/0198586 A1 | 6/2020 | Doi |
| 2021/0188281 A1 | 6/2021 | Jung et al. |

FOREIGN PATENT DOCUMENTS

| | | |
|---|---|---|
| JP | 2014-19390 A | 2/2014 |
| JP | 2014-24368 A | 2/2014 |
| JP | 2015-54604 A | 3/2015 |
| JP | 2016-88201 A | 5/2016 |
| JP | 2016-196285 A | 11/2016 |
| JP | 2017-138724 A | 8/2017 |
| JP | 2017-146723 A | 8/2017 |
| JP | 2017-202768 A | 11/2017 |
| JP | 2018-132533 A | 8/2018 |

OTHER PUBLICATIONS

Non-Final Office Action dated Mar. 22, 2022 in U.S. Appl. No. 16/680,954, filed Nov. 12, 2019.

Notice of Allowance dated Jul. 18, 2022, to U.S. Appl. No. 16/680,954, filed Nov. 12, 2019.

Second Non-Final Office Action dated Sep. 15, 2022 in U.S. Appl. No. 16/680,944, filed Nov. 12, 2019.

* cited by examiner

VEHICLE CONTROL SYSTEM

CROSS-REFERENCE TO RELATED APPLICATION

The present application is based on, and claims priority from, Japanese Patent Application Serial Number 2018-213867, filed on Nov. 14, 2018, the disclosure of which is hereby incorporated by reference herein in its entirety.

FIELD

The present disclosure relates to a vehicle control system, and more particularly, to a vehicle control system that performs evacuation traveling in which a vehicle is automatically evacuated when a consciousness level of a driver is lowered.

BACKGROUND

Japanese Patent Laid-Open No. 2009-151522 discloses a technique related to an emergency evacuation system for evacuating a vehicle to a shoulder of a road when a consciousness level of a driver is lowered. In this technique, when the consciousness level of the driver is lowered during the lane change, if no vehicle is detected rearward, the vehicle is returned to the original traveling lane. As a result, the number of lane changes at the time of evacuating to the evacuation destination is reduced. Japanese Patent Laid-Open No. 2017-146723 discloses a technique for preventing a driver from interference with a steering by a traction operation of a seat belt of a driver seat even when a consciousness disturbance occurs in the driver.

SUMMARY

When the consciousness level of a driver is lowered, the driver may become stuck in the steering. In this state, when the vehicle is evacuated to the shoulder of the road, the body of the driver may come into contact with an operation switch due to the rotation of the steering accompanying the lane change. If operations for ensuring visibility such as lights, wipers, and direction indicator are obstructed, it may be difficult to safely evacuate the vehicle to the shoulder by automated driving.

The present disclosure has been made in view of the above-mentioned problems, and an object thereof is to provide a vehicle control system capable of increasing the possibility of safely evacuating a vehicle in evacuation traveling in which the vehicle is automatically evacuated when a consciousness level of a driver is lowered.

In order to solve the above problems, a first disclosure is applied to a vehicle control system installed on a vehicle. The vehicle includes an operation switch for manually operating the operation state of accessories installed to the body. The system includes a first controller and a second controller. When the consciousness level of a driver is lower than a predetermined determination value, the first controller performs an evacuation traveling in which the vehicle is automatically evacuated. The second controller controls the operation state of the accessories based on a request from the first controller or operation information of the operation switch. The first controller is configured to transmit a specific operation rejection request to the second controller when the consciousness level of the driver is lower than a predetermined determination value. The specific operation rejection request is a request for performing a specific operation rejection process for rejecting the control of the accessories based on the specific operation of the operation switch. The second controller is configured to perform the specific operation rejection process when the specific operation rejection request is received from the first controller.

A second disclosure has the following further features in the first disclosure. The accessories include a headlight. The operation switch includes a light switch. Here, the light switch includes a light-on position for turning on the headlight and a light-off position for turning off the headlight. The specific operation includes an operation of the light switch to the light-off position.

A third disclosure further has the following features in the second disclosure. The light switch further includes an auto-light position for performing an auto-light process for automatically switching the operating state of the headlight in accordance with the external environment. The first controller is configured to transmit an auto light request for performing an auto-light process to the second controller when the consciousness level of the driver is lower than a predetermined determination value. The second controller is configured to perform auto-light process when an auto-light request is received from the first controller in a state where the light switch is operated to the light-off position.

A fourth disclosure further has the following features in the second disclosure. The first controller is configured to transmit a light-on request for turning on the headlight to the second controller when the consciousness level of the driver is lower than a predetermined determination value. The second controller is configured to turn on the headlight when a light-on request is received from the first controller in a state where the light switch is operated at a position different from the light-on position.

A fifth disclose further has the following features in the first disclosure. The accessories include a wiper. The operation switch includes a wiper switch. The wiper switch includes a wiper-on position for driving the wiper and a wiper-off position for stopping the wiper. The specific operation includes an operation of the wiper switch to the wiper-off position.

A sixth disclose has the following features in the fifth disclosure. The wiper switch further includes an auto-wiper position for performing an auto-wiper process for automated switching the operating state of the wiper according to the external environment. The first controller is configured to transmit an auto-wiper request for performing an auto-wiper process to the second controller when the consciousness level of the driver is lower than a predetermined determination value. The second controller is configured to perform the auto-wiper process when the auto-wiper request is received from the first controller in a state where the wiper switch is operated to the wiper-off position or the wiper-on position.

A seventh disclose further has the following features in the first disclosure. The accessories include a direction indicator. The operation switch includes a direction indicator switch for switching the lighting state of the direction indicator. The specifying operation includes an operation of the direction indicator switch.

According to the vehicle control system of the first disclosure, it is possible to reject the control of the accessories by the specific operation even if the driver whose level of consciousness is lowered erroneously operates the operation switch during the evacuation traveling. This makes it possible to increase the possibility of safely evacuating the vehicle during evacuation traveling.

According to the second disclosure, the operation of turning off the headlight can be rejected during the evacuation traveling. As a result, it is possible to prevent difficulty in securing the visibility during the evacuation traveling, and therefore it is possible to increase the possibility of safely evacuating the vehicle during the evacuation traveling.

According to the third disclosure, the operating state of the headlight during the evacuation traveling is automatically switched to the auto-light mode. As a result, it is possible to automatically secure the visibility in accordance with the external environment, and therefore it is possible to increase the possibility of safely evacuating the vehicle during evacuation traveling.

According to the fourth disclosure, the operating state of the headlight during the evacuation traveling is automatically switched to the light-on mode. As a result, it is possible to automatically secure the visibility in accordance with the external environment, and therefore it is possible to increase the possibility of safely evacuating the vehicle during evacuation driving.

According to the fifth disclose, it is possible to reject the stop operation of the wiper during the evacuation traveling. As a result, it is possible to prevent difficulty in securing the visibility during the evacuation driving, and therefore it is possible to increase the possibility of safely evacuating the vehicle during the evacuation traveling.

According to the sixth disclose, the operating state of the wiper during the evacuation traveling is automatically switched to the auto-wiper mode. As a result, it is possible to automatically secure the visibility in accordance with the external environment, and therefore it is possible to increase the possibility of safely evacuating the vehicle during evacuation traveling.

According to the seventh disclose, the operation of the direction indicator can be rejected during the evacuation traveling. As a result, it is possible to prevent the evacuation traveling from being obstructed during the evacuation traveling, and therefore it is possible to increase the possibility of safely evacuating the vehicle during the evacuation traveling.

As described above, according to the present disclosure, it is possible to provide a vehicle control system capable of increasing the possibility of safely evacuating a vehicle in evacuation driving in which the vehicle is automatically evacuated when the driver's consciousness level is lowered.

DETAILED DESCRIPTION

Hereinafter, embodiments of the present disclosure will be described with reference to the accompanying drawings. However, it is to be understood that even when the number, quantity, amount, range or other numerical attribute of each element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly described otherwise, or unless the present disclosure is explicitly specified by the structures, steps or the like theoretically.

1. First Embodiment 1-1. Overall Configuration of Vehicle Control System

Figure 1:
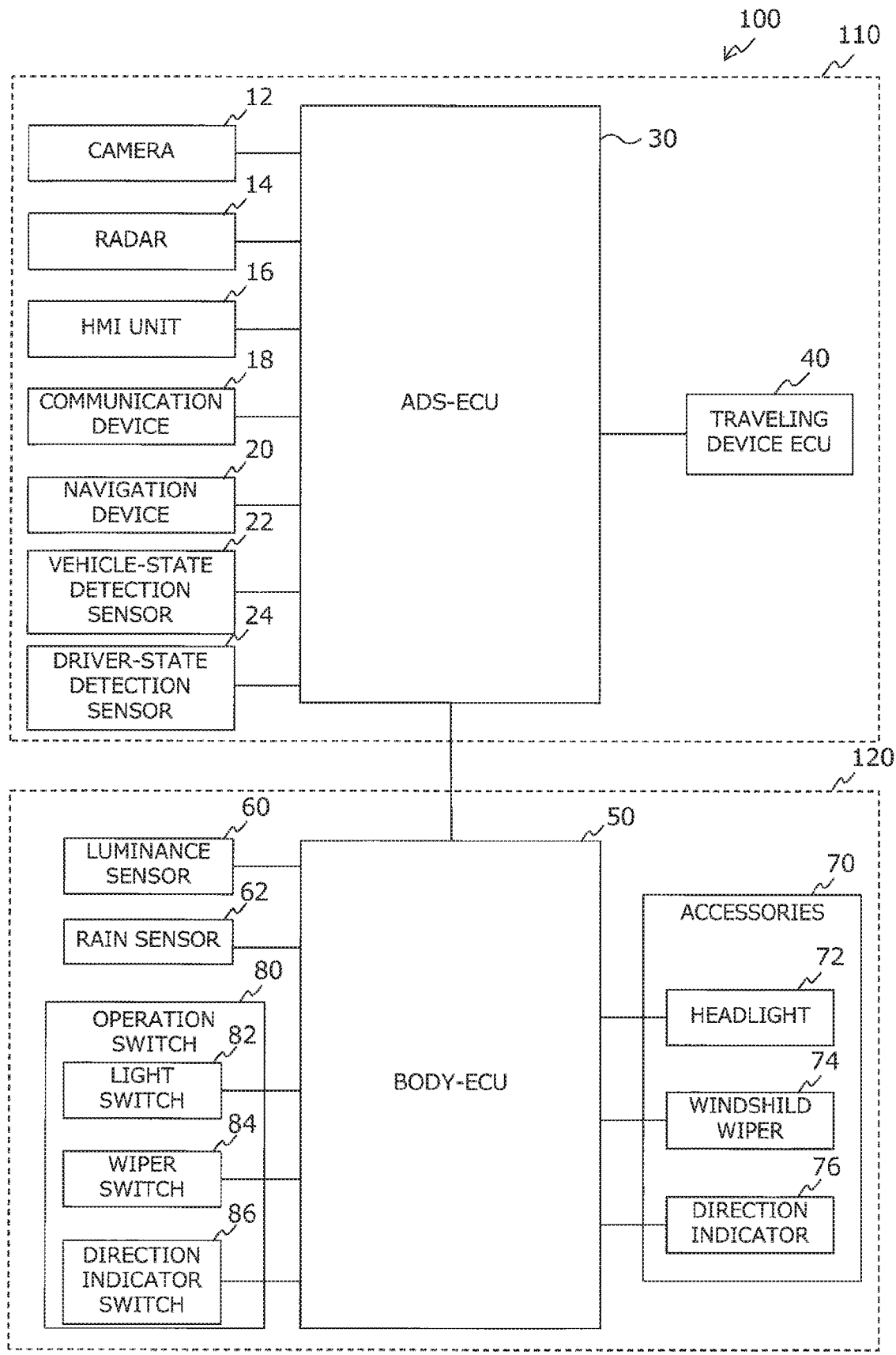
FIG. 1 is a block diagram showing an example of a configuration of a vehicle control system according to a first embodiment.

FIG. 1 is a block diagram showing a configuration example of a vehicle control system according to the first embodiment. The vehicle control system 100 shown in FIG. 1 is installed on a vehicle. Hereinafter, the vehicle on which the automated driving system is installed is also referred to as "vehicle M1". Examples of the vehicle M1 include an automobile that uses an internal combustion engine as a power source, an electric automobile that uses an electric motor as a power source, and a hybrid automobile that includes an internal combustion engine and an electric motor. The electric motor is driven by a battery such as a secondary battery, a hydrogen fuel cell, a metal fuel cell, an alcohol fuel cell, or the like.

As shown in FIG. 1, the vehicle control system 100 includes a first control system 110 and a second control system 120. The first control system 110 is a system for performing automated driving control of the vehicle M1. The second control system 120 is a system for controlling the operation of the accessories 70 of the vehicle M1. Hereinafter, the configuration of these systems will be described.

The first control system 110 includes an electronic control unit (hereinafter, also referred to as "ADS-ECU") 30 for automated driving control. The first control system 110 includes a camera 12, a radar 14, an HMI unit 16, a communication device 18, a navigation device 20, a vehicle-state detection sensor 22, and a driver-state detection sensor 24, all of which are connected to inputs of the ADS-ECU 30. Furthermore, the first control system 110 includes an electronic control unit (hereinafter also referred to as "travelling device ECU") 40 for a traveling device that is connected to outputs of the ADS-ECU 30.

The camera 12 functions as information acquisition means for acquiring peripheral information of the vehicle M1, for example, a front camera for capturing an image of the front of the vehicle M1, a left rear camera for capturing an image of the left rear of the vehicle M1, and a right rear camera for capturing an image of the right rear of the vehicle M1. The images picked up by the cameras 12 are transmitted as image data to the ADS-ECU 30 at any time, and are subjected to image processes on the respective image data in the ADS-ECU 30. The peripheral information acquired by the camera 12 is, for example, position information and white line information of peripheral vehicles traveling around the vehicle M1, and road information such as signal information.

The radar 14 is, for example, a laser radar, a millimeter wave radar, or the like, and functions as information acquisition means for acquiring peripheral information of the vehicle M1. The radar 14 transmits a laser wave or the like to the front and the rear of the vehicle M1, respectively, and receives the reflected wave to acquire peripheral information of the vehicle M1. The peripheral information acquired by the radar 14 includes, for example, information on the presence or absence of a peripheral vehicle, distance to the peripheral vehicle, angle (i.e., relative position) and speed (relative speed) information, and positional information of a utility pole, a building, or the like. The respective pieces of information detected by the radar 14 are transmitted to the ADS-ECU 30 at any time.

The HMI unit 16 is an interface for providing information to the driver of the vehicle M1 and for receiving information from the driver. For example, the HMI unit 16 includes an input device, a display device, and a speaker. Examples of the input device include a touch panel, a keyboard, a switch, and a button. The driver may input information such as a destination using the input device to the HMI unit 16. The information input from the driver is transmitted to the ADS-ECU 30 at any time.

The communication device 18 functions as an information acquisition unit that receives peripheral information from a roadside system provided on a road via an antenna provided in the vehicle M1. The roadside system is, for example, a beacon device that transmits, for example, traffic jam information, traffic information by lane, regulation information such as a stop, traffic situation information of a blind spot positions, and the like. The communication device 18 also functions as an information acquiring means for communicating with a peripheral vehicle in the vicinity of the vehicle M1, directly via an antenna, or via a relay station (not shown). The peripheral information acquired here includes, for example, position information and speed information of peripheral vehicles.

The respective pieces of information received by the communication device 18 are transmitted to the ADS-ECU 30 at any time.

The navigation device 20 detects the current position of the vehicle M1 from a GPS satellite via an antenna. The navigation device 20 also detects the traveling speed of the vehicle M1 and guides the vehicle to the destination by using the GPS, a speed sensor, a gyroscope, and the like. The navigation device 20 incorporates map data including detailed road information. The map data includes, for example, information on the shape of the road, the number of lanes, the lane width, and the like. The present position information, the road information, and the like acquired by the navigation device 20 are transmitted to the ADS-ECU 30 at any time.

The vehicle-state detection sensor 22 detects the traveling state of the vehicle M1. Examples of the vehicle-state detection sensor 22 include a vehicle speed sensor, a lateral acceleration sensor, and a yaw rate sensor. The information detected by the vehicle-state detection sensor 22 is transmitted to the ADS-ECU 30 at any time.

The driver-state detection sensor 24 detects the consciousness level of the driver who is driving the vehicle M1. The driver's consciousness level detected here includes, for example, a heartbeat state, a breathing state, and the like. The heartbeat state of the driver is grasped by detecting the heartbeat rate of the driver holding the steering wheel, for example, by an electrode incorporated in the steering wheel. Further, the breathing state of the driver is grasped by observing a change in the detection value of the load sensor incorporated in the seat on which the driver sits. The method of detecting the driver's consciousness level is not particularly limited, and may be any method as long as the consciousness level determination processing unit 32, which will be described later, can determine whether or not the driver is in a difficult driving state.

The ADS-ECU 30 corresponds to a first controller of the vehicle control system 100. The ADS-ECU 30 performs automated driving control for automatically driving the vehicle M1. Typically, the ADS-ECU 30 is a microcomputer including a processor, memories, and input/output interfaces. The ADS-ECU 30 receives information required for automated driving control from various information acquiring units via input/output interfaces. Then, the ADS-ECU 30 performs automated driving control based on the received data. Specifically, the ADS-ECU 30 formulates a travel plan of the vehicle M1, and outputs information to the traveling device ECU 40 so that the vehicle M1 travels along the travel plan. The automated driving control executed by the ADS-ECU 30 includes an evacuation traveling control. The evacuation traveling control is a control for automatically evacuating the vehicle M1 to a safe place such as a road shoulder when the driver's consciousness level is lowered. The evacuation traveling control will be described later.

The traveling device ECU 40 is a microcomputer having the same configuration as the ADS-ECU 30. The traveling device ECU 40 is composed of a plurality of ECUs. These ECUs control various types of traveling devices (not shown) for automated traveling the vehicle M1 in accordance with various types of information inputted from the ADS-ECU 30. These traveling devices include a driving force output device, a steering device, and a braking device. The driving force output device is a power source for generating a traveling driving force. The steering device steers the wheels. The braking device generates a braking force.

A known technique is applied to the automated driving control performed by the ADS-ECU 30. Therefore, descriptions of the functions of the ADS-ECU 30 related to the automated driving control will be omitted or simplified. The details of the functions related to the features of the present embodiment will be described later.

The second control system 120 includes an electronic control unit (hereinafter, also referred to as "BODY-ECU") 50 for controlling accessories. The second control system 120 includes a luminance sensor 60, a rain sensor 62, and an operation switch 80, all of which are connected to the inputs of the BODY-ECU 50. The second control system 120 further includes accessories 70 connected to the output side of the BODY-ECU 50.

The luminance sensor 60 detects the luminance of the external environment at the position of the vehicle M1. The luminance sensor 60 is installed, for example, on the back side of the windshield near the room mirror. The luminance sensor 60 transmits the detected information (hereinafter, also referred to as "luminance information") to the BODY-ECU 50 at any time. The luminance sensor 60 may transmit luminance information not only to the BODY-ECU 50 but also to the ADS-ECU 30. In this instance, the luminance information is transmitted to the ADS-ECU 30 as one of the information detected by the external sensor.

The rain sensor 62 detects rainfall of the external environment at the position of the vehicle M1. The rain sensor 62 is installed, for example, on the back side of the windshield near the room mirror. The rain sensor 62 detects rain when a position at which the wiper switch 84 described later stops (hereinafter, also referred to as "wiper switch position") is in an "auto-wiper position" described later. The rain sensor 62 transmits the detected information (hereinafter, also referred to as "rainfall information") to the BODY-ECU 50 at any time.

The accessories 70 are a component installed to the body of the vehicle M1, and include a headlight 72, a windshield wiper 74, and a direction indicator 76. The operation switch 80 is a switch for manually operating the operation states of these accessories 70. Specifically, the operation switch 80 includes a light switch 82, a wiper switch 84, and a direction indicator switch 86.

The BODY-ECU 50 corresponds to the second controller of the vehicle control system 100. The BODY-ECU 50 is a microcomputer including a processor, memories, and input/output interfaces. The BODY-ECU 50 receives external environmental information from the luminance sensor 60 and the rain sensor 62 and operation information from the operation switch 80 via the input/output interfaces. Then, the BODY-ECU 50 executes accessory control for controlling the operation of the accessories 70 based on the received data. The accessory control includes headlight control, wiper control, and direction indicator control. These controls performed by the BODY-ECU 50 will be described in detail later.

1-2. Evacuation Traveling Control

Figure 2:
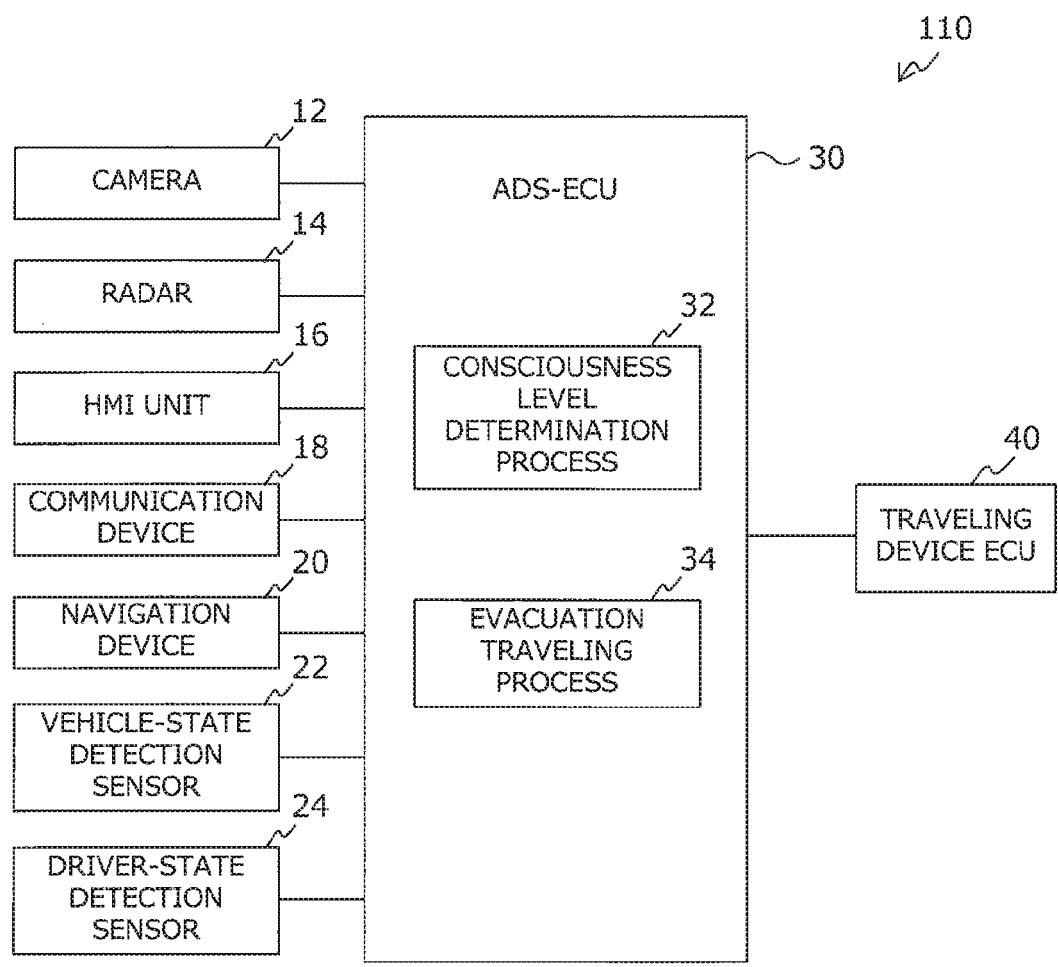
FIG. 2 is a diagram for explaining functional blocks of an ADS-ECU for performing an evacuation traveling control.

The vehicle control system 100 of the first embodiment performs evacuation traveling control for automatically evacuating and stopping the vehicle M1 to a safe location such as a shoulder when the driver of the vehicle M1 becomes difficult to dive. FIG. 2 is a diagram for explaining functional blocks of the ADS-ECU for performing the evacuation traveling control. As shown in FIG. 2, the ADS-ECU 30 includes a consciousness level determination processing unit 32 and an evacuation traveling control unit 34 as functional blocks for performing the evacuation traveling control. The consciousness level determination processing unit 32 performs consciousness level determination processing based on the consciousness level input from the driver-state detection sensor 24. Specifically, when the input consciousness level is lower than a predetermined determination level, the consciousness level determination processing unit 32 determines that the driver is in a difficult driving state. The consciousness level is, for example, a heartbeat state or a breathing state, and the predetermined determination level is a threshold value for determining a normal value and an abnormal value of these consciousness levels. When the consciousness level is equal to or higher than the predetermined determination level, the consciousness level determination processing unit 32 determines that the driver is in a drivable state. When it is determined by the consciousness level determination processing unit 32 that the driver is in a state difficulty in driving, the evacuation traveling control unit 34 executes evacuation traveling control. Specifically, the evacuation traveling control unit 34 determines a safe evacuation place such as a road shoulder based on various input information, and formulates a travel plan for guiding the vehicle M1 to the evacuation place. The planned travel plan is outputted to the traveling device ECU 40. The traveling device ECU 40 controls a traveling device (not shown) based on the inputted travel plan.

1-3. Headlight Control

Figure 3:
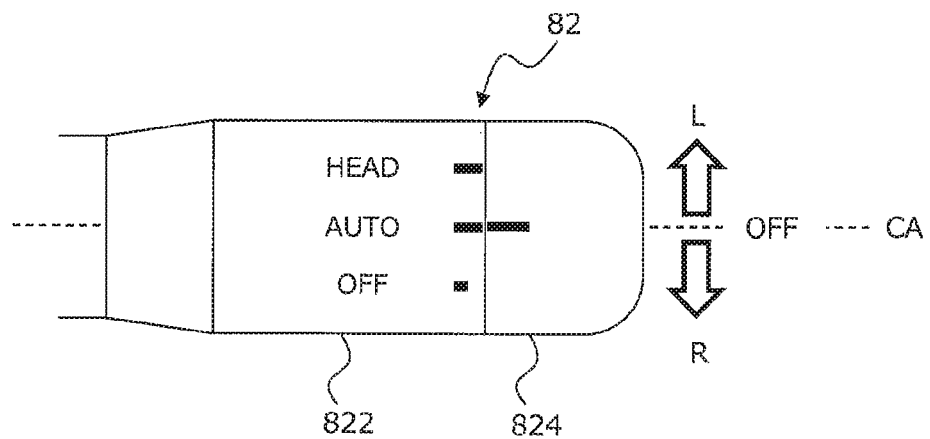
FIG. 3 is a schematic diagram showing a configuration example of a light switch.

FIG. 3 is a schematic diagram showing a configuration example of the light switch. The light switch 82 shown in FIG. 3 is disposed on the right side of the steering column of the vehicle M1. The light switch 82 includes a main body 822 and a knob 824. The knob 824 is provided at the distal end of the main body 822. The knob 824 is rotatably supported around the central axis CA of the light switch 82.

The main body 822 has three positions at which the rotation of the knob 824 is stopped (hereinafter, also referred to as "light switch positions"). The positions of "AUTO", "HEAD" and "OFF" shown in FIG. 3 correspond to the light switch positions. In the following explanation, the position of "HEAD" among the light switch positions is also denoted as "light-on position", the position of "AUTO" is also denoted as "auto-light position", and the position of "OFF" is also denoted as "light-off position".

When the light switch position is in the "light-on position", a light-on signal is transmitted from the light switch 82 to the BODY-ECU 50. When the light switch position is in the "auto-light position", the light switch 82 transmits an auto-light signal to the BODY-ECU 50. When the light switch position is in the "light-off position", the light switch 82 transmits a light-off signal to the BODY-ECU 50.

The BODY-ECU 50 controls the lighting operation of the headlight 72 based on the input signal from the light switch 82 and the luminance information. When the light-on signal is inputted from the light switch 82, the BODY-ECU 50 always lights the headlight 72. When the auto-light signal is inputted from the light switch 82, the BODY-ECU 50 performs an auto-light process for turning on or off the headlight 72 in accordance with the luminance information. In the auto-light process, the BODY-ECU 50 turns on the headlight 72 when the auto-light signal is inputted and the luminance is less than the reference level. When the auto-light signal is inputted and the luminance of the signal is equal to or higher than the reference value, the BODY-ECU 50 turns off the headlight 72. Further, when the light-off signal is inputted from the light switch 82, the BODY-ECU 50 always turns off the headlight 72.

1-4. Wiper Control

Figure 4:
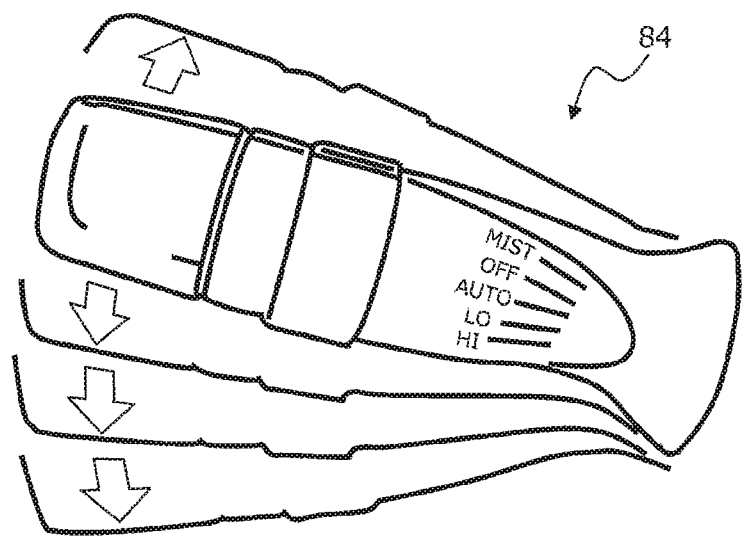
FIG. 4 is a schematic diagram showing a configuration example of a wiper switch.

FIG. 4 is a schematic diagram showing a configuration example of the wiper switch. The wiper switch 84 shown in FIG. 4 is disposed on the left side of the steering column of the vehicle M1. The wiper switch 84 is a device for driving the windshield wiper 74. As shown in FIG. 4, five wiper switch positions are provided in the wiper switch 84. The positions of "MIST", "OFF", "AUTO", "LO" and "HI" shown in FIG. 4 correspond to these wiper switch positions. In the following explanation, the positions of "LO" and "HI" among the wiper switch positions are also denoted as "wiper-on position", the position of "AUTO" is also denoted as "auto-wiper position", and the position of "OFF" is also denoted as "wiper-off position".

The wiping operation of the windshield wiper 74 is performed by changing the wiper switch position. Note that the "MIST" position is a position that can be used only while the wiper switch 84 is pushed upward from the "wiper-off position", and automated returns to the "wiper-off position" when the hand is released from the wiper switch 84.

When the wiper switch position is in the "MIST" position, a wiper-mist signal is transmitted from the wiper switch 84 to the BODY-ECU 50. When the wiper switch position is in the "wiper-off position", a wiper-off signal is transmitted from the wiper switch 84 to the BODY-ECU 50. When the wiper switch position is in the "auto-wiper position", an auto-wiper signal is transmitted from the wiper switch 84 to the BODY-ECU 50. When the wiper switch position is in the "LO" or "HI" position, wiper-on signals corresponding to the respective positions are transmitted from the wiper switch 84 to the BODY-ECU 50.

The BODY-ECU 50 controls the wiping operation by the windshield wiper 74 based on the input signal from the wiper switch 84 and the rainfall information. When the wiper-off signal is inputted from the wiper switch 84, the BODY-ECU 50 stops the wiping operation by the windshield wiper 74. When the wiper-mist signal is inputted from the wiper switch 84, the BODY-ECU 50 executes the wiping operation by the windshield wiper 74 a predetermined number of times. In this case, the cleaning liquid is sprayed onto the windshield in synchronization with the wiping operation by the windshield wiper 74. When the auto-wiper signal is inputted from the wiper switch 84, the BODY-ECU 50 performs an auto-wiper process for controlling the wiping operation by the windshield wiper 74 based on the input rainfall information. When the wiper-on signal is inputted from the wiper switch 84, the BODY-ECU 50 performs a wiping operation in accordance with the corresponding wiper-on signal. Specifically, when the wiper-on signal is a signal corresponding to the "LO" position, the wiping operation of the windshield wiper 74 is performed at a low speed. On the other hand, when the wiper-on signal is a signal corresponding to the "HI" position, the wiping operation of the windshield wiper 74 is performed at high speed.

1-5. Direction Indicating Control

In the main body 822 of the light switch 82 shown in FIG. 3, the direction indicator switch 86 for switching the lighting state of the direction indicator 76 is disposed. Specifically, the direction indicator switch 86 is configured such that a direction indicating position is switched between "L", "OFF", and "R" by changing the position of the main body 822 in the vertical direction among the upper, middle, and lower directions. The direction indicating operation is performed when the driver manually changes the direction indicating position. When the direction indicating position is in the "L", "OFF" and "R" positions, the L signal, the OFF signal and the R signal are transmitted from the direction indicator switch 86 to the BODY-ECU 50, respectively. The BODY-ECU 50 controls the direction indicator 76 based the inputted signals from the direction indicator switch 86. When the L signal or the R signal is inputted from the direction indicator switch 86, the BODY-ECU 50 performs a direction indicating operation in the left direction or the right direction by the direction indicator 76, respectively. When the OFF signal is inputted from the direction indicator switch 86, the BODY-ECU 50 stops the direction indicating operation by the direction indicator 76.

1-6. Features of the Vehicle Control System According to the First Embodiment It is also conceivable that when the driver's consciousness level of the vehicle M1 decreases, the driver may be in a state of slumping over the steering. In this state, when the vehicle is evacuated to the shoulder of the road, the body of the driver may accidentally move due to the rotation of the steering caused by the lane change, and the driver may touch the operation switch 80. If the operation for ensuring visibility, such as the headlight 72, the windshield wiper 74, and the direction indicator 76, is obstructed, it may be difficult to safely evacuate the vehicle M1 to the shoulder by automated driving.

In the vehicle control system 100 according to the first embodiment, when it is determined that the consciousness level of the driver is lowered, a specific operation rejection control for rejecting the manual specific operation of the operation switch 80 is performed. The specific operation includes the operation of the light switch 82 to the "light-off position", the operation of the wiper switch 84 to the "wiper-off position", and general operations of the direction indicator 76.

Figure 5:
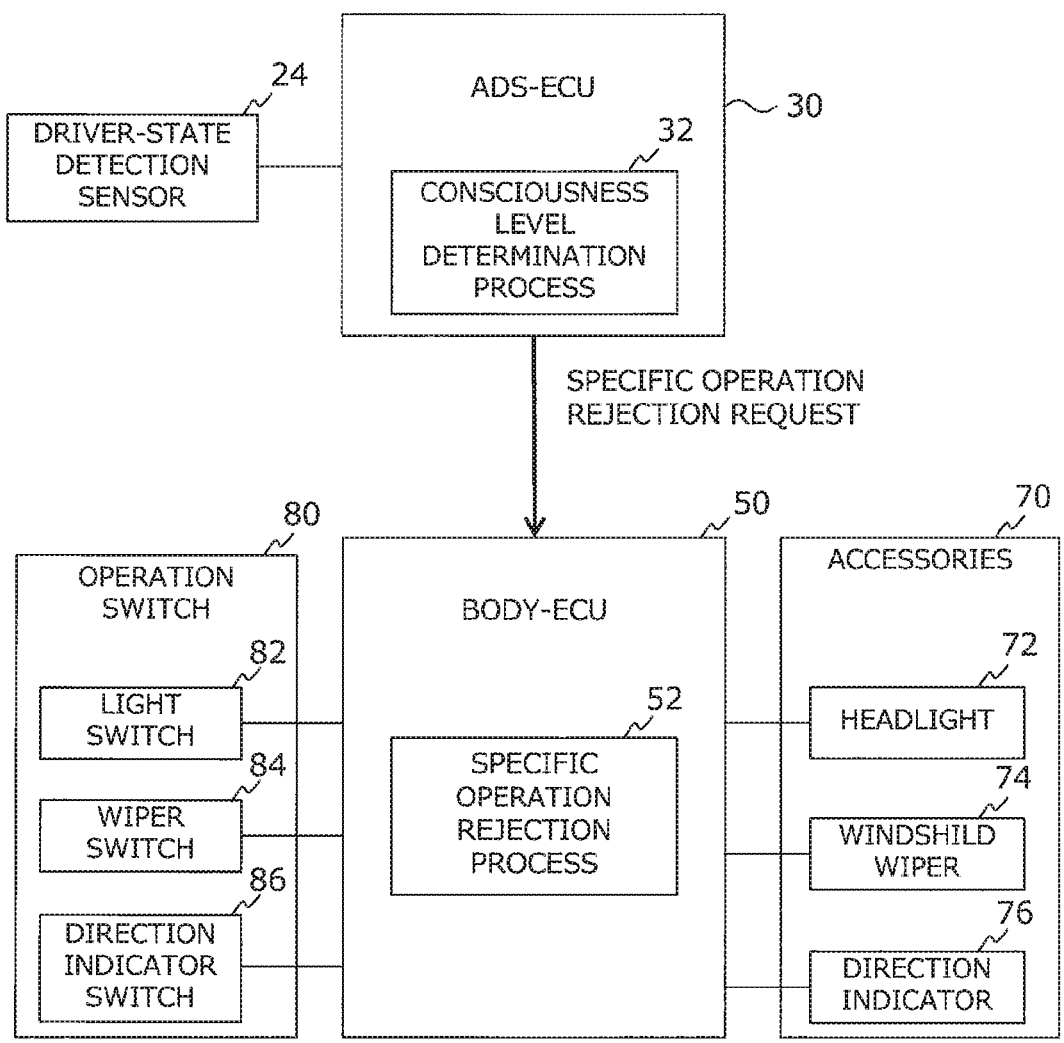
FIG. 5 is a functional block diagram of the vehicle control system for performing a specific operation rejection control according to the first embodiment.

FIG. 5 is a functional block diagram of the vehicle control system for performing the specific operation rejection control. As shown in the drawing, the ADS-ECU 30 includes the above-described consciousness level determination processing unit 32. The BODY-ECU 50 includes a specific operation rejection processing unit 52. The specific operation rejection control is performed by the cooperation between the ADS-ECU 30 and the BODY-ECU 50. Hereinafter, a specific process executed in the specific operation rejection control will be described with reference to a flowchart.

1-7. Specifically Process of Specific Operation Rejection Control

Figure 6:
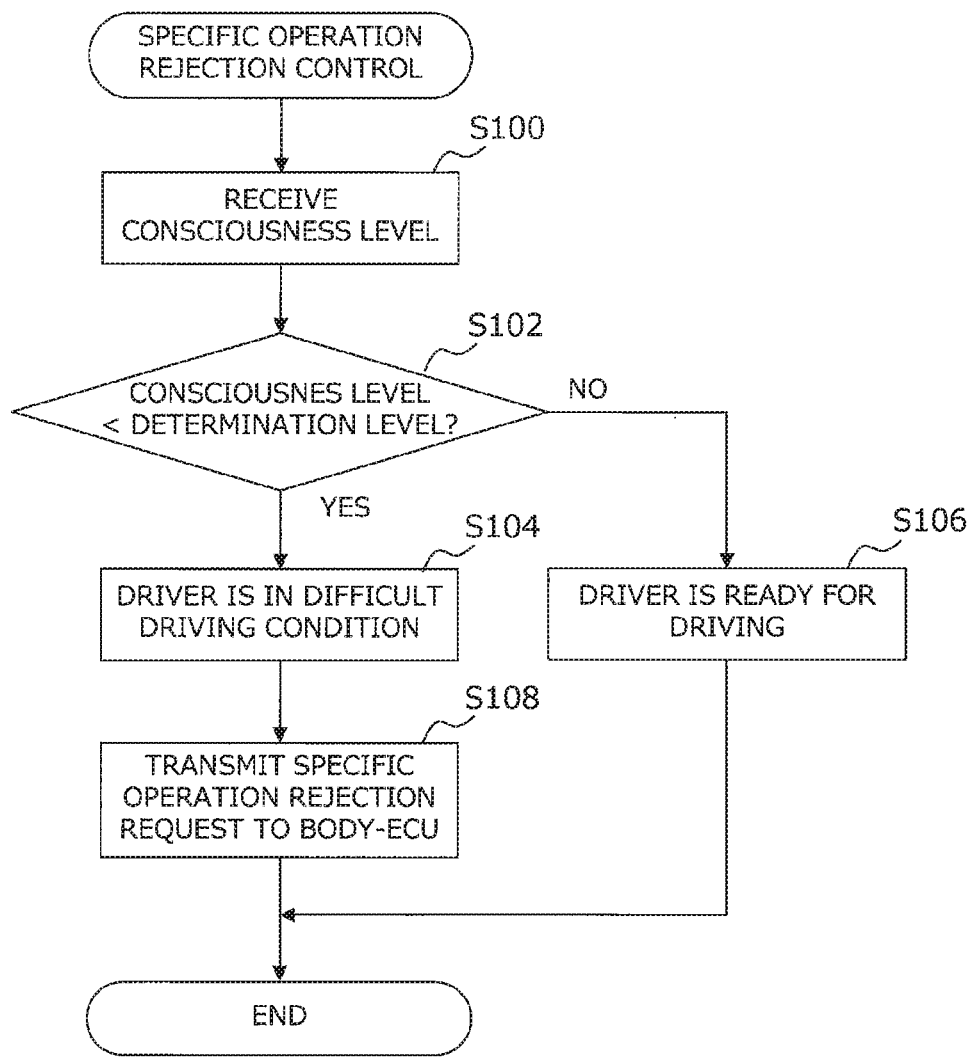
FIG. 6 is a flow chart showing a control routine executed by the ADS-ECU in the specific operation rejection control according to the first embodiment.
Figure 7:
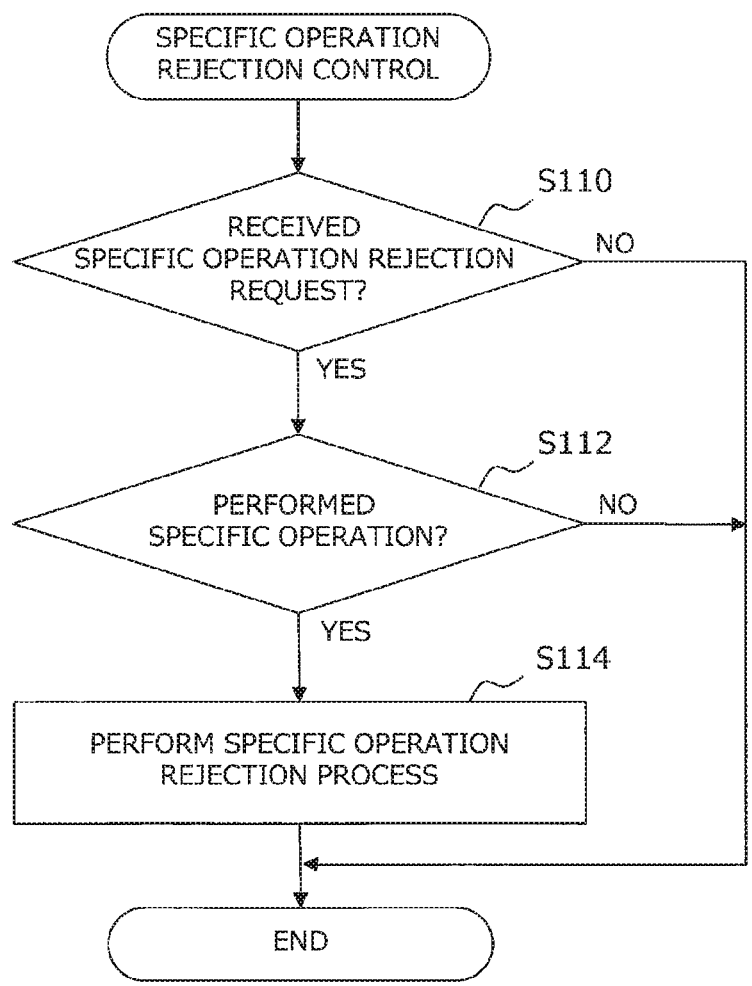
FIG. 7 is a flow chart of a control routine executed by a BODY-ECU in the specific operation rejection control of the first embodiment.

FIG. 6 is a flow chart showing a control routine executed by the ADS-ECU in the specific operation rejection control. FIG. 7 is a flow chart of a control routine executed by the BODY-ECU in the specific operation rejection control.

The routine shown in FIG. 6 is repeatedly executed in the consciousness level determination processing unit 32 of the ADS-ECU 30 at a predetermined control cycle while the vehicle M1 is traveling. First, the ADS-ECU 30 receives the level of consciousness from the driver-state detection sensor 24 (step S100). Next, in step S102, the ADS-ECU 30 determines whether or not the received consciousness level is smaller than a predetermined determination level. As a result, if the determination is successful (YES in step S102), the ADS-ECU 30 determines that the driver is in a difficult driving condition (step S104). On the other hand, if the determination is not satisfied (NO in step S102), the ADS-ECU 30 determines that the driver is ready for driving (step S106).

After the process of step S104 is performed, the ADS-ECU 30 transmits a specific operation rejection request to the BODY-ECU 50 (step S108). After the process of step S108 or S106 is completed, the control routine in terminated.

The routine shown in FIG. 7 is repeatedly executed in the specific operation rejection processing unit 52 of the BODY-ECU 50 at a predetermined control cycle while the vehicle M1 is traveling. First, in step S110, the BODY-ECU 50 determines whether a specific operation rejection request has been received from the ADS-ECU 30. As a result, if the determination is not satisfied (NO in step S110), the control routine is terminated. On the other hand, if the determination is confirmed (YES in step S110), the BODY-ECU 50 determines whether or not a specific operation has been performed by the operation switch 80 (step S112). Specifically, it is determined whether or not a signal indicating the operation of the light switch 82 to the "light-off position", the operation of the wiper switch 84 to the "wiper-off position", or the operation of the direction indicator 76 is input from the operation switch 80. As a result, if the determination is not established (NO in step S112), the control routine is terminated. On the other hand, if the determination is successful (YES in step S112), the BODY-ECU 50 performs a specific operation rejection process (step S114). Here, the BODY-ECU 50 rejects to change the operation of the accessories 70 based on the signal of the specific operation. When the process of step S114 is completed, this routine is terminated.

As described above, according to the vehicle control system 100 of the first embodiment, by the cooperation between the ADS-ECU 30 and the BODY-ECU 50, it is possible to reject a specific operation of the accessories 70 when the consciousness level is lowered. As a result, it is possible to avoid an unintentional operation change of the accessories 70 to cause a trouble in the evacuation traveling control.

1-8. Modification Examples

The vehicle control system 100 according to the first embodiment may adopt a modified embodiment as described below.

The wiper switch 84 may further include "INT" for intermittently performing the wiping operation of the windshield wiper 74 as the operable wiper switch position. When the wiper switch position is in the INT position, the wiper switch 84 may transmit a wiper-on signal corresponding to the INT position to the BODY-ECU 50. This also applies to other embodiments described later.

2. Second Embodiment

Next, the vehicle control system according to the second embodiment will be described with reference to the drawings.

2-1. Configuration of Vehicle Control System According to Second Embodiment

The configuration of the vehicle control system according to second embodiment is the same as that of the vehicle control system 100 of the first embodiment shown in FIG. 1. The detailed configuration of the vehicle control system according to the second embodiment is omitted.

2-2. Characteristic Functions of Vehicle Control System According to Second Embodiment When the consciousness level of the driver of the vehicle M1 decreases, the light switch position of the light switch 82 may be in the "light-off position". If the evacuation traveling is performed in this state, it may be difficult to secure the visibility when passing through a dark place such as a tunnel or when the day falls and becomes dark thereafter. In this case, the sensors necessary for the evacuation may not function normally, and it may be difficult to safely evacuate the vehicle M1 to the shoulder by the automated driving.

Figure 8:
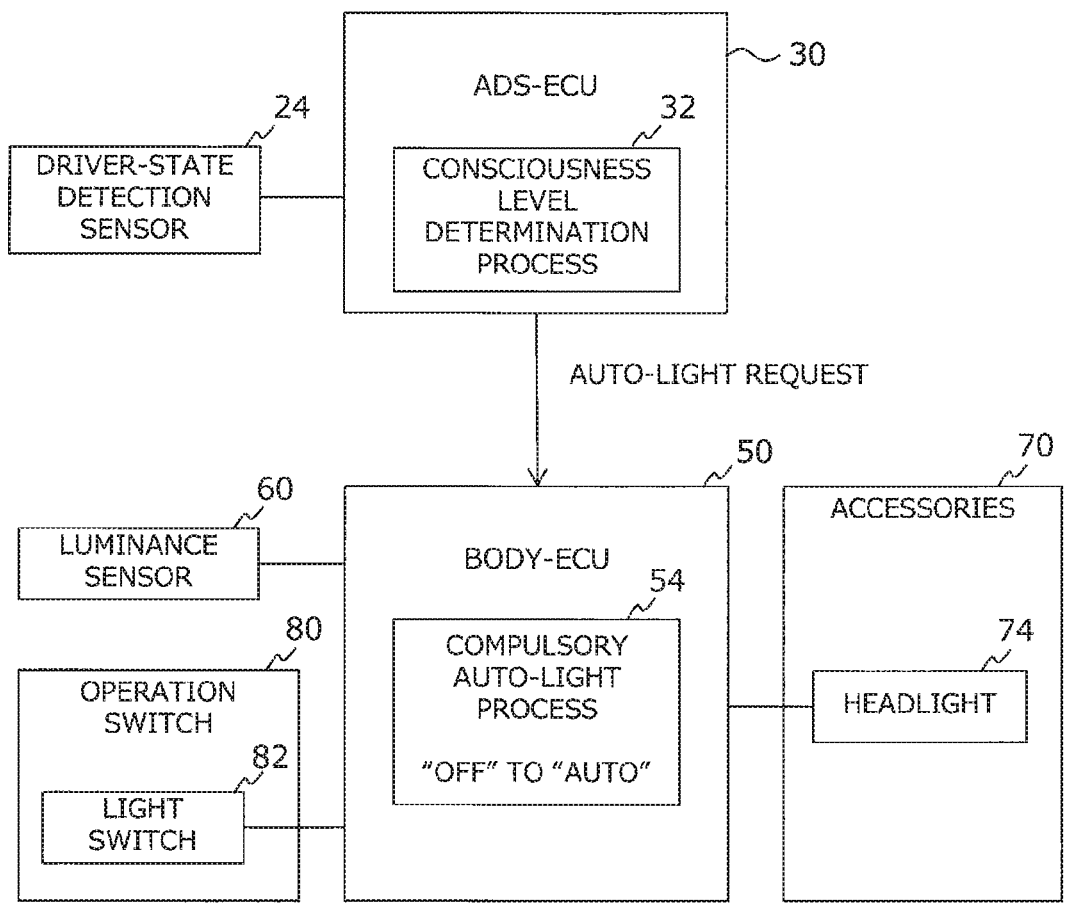
FIG. 8 is a functional block diagram of the vehicle control system for performing a compulsory auto-light control according to the second embodiment.

In the vehicle control system according to the second embodiment, when the consciousness level of the driver is lowered and the light switch position is in the "light-off position", a compulsory auto-light control for compulsorily performing the auto-light process is performed. FIG. 8 is a functional block diagram of the vehicle control system for performing the compulsory auto-light control. As shown in the drawing, the ADS-ECU 30 includes the above-described consciousness level determination processing unit 32. The BODY-ECU 50 includes a compulsory auto-light processing unit 54. The compulsory auto-light control is performed by the cooperation between the ADS-ECU 30 and the BODY-ECU 50. Hereinafter, a specific process of the compulsory auto-light control executed in the vehicle control system of the second embodiment will be described with reference to the flowchart.

2-3. Specifically Process of the Compulsory Auto-Light Control

Figure 9:
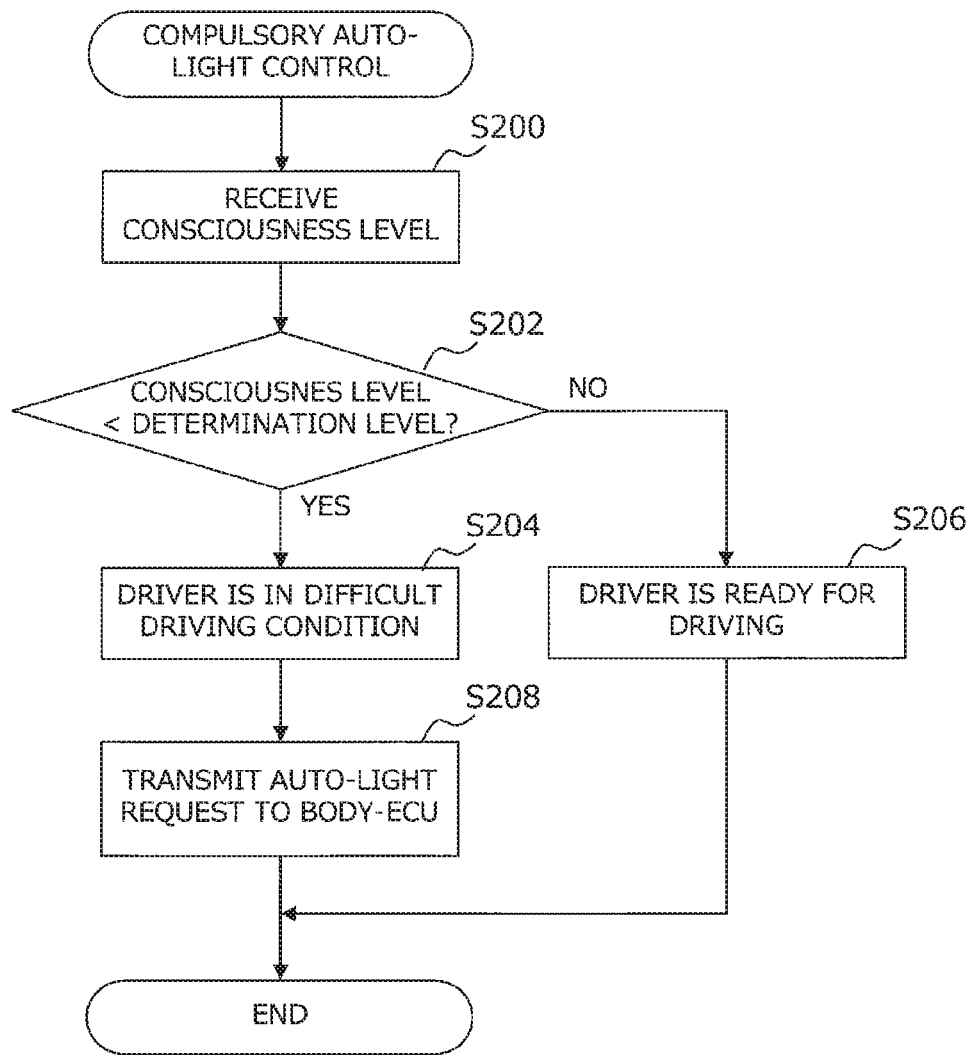
FIG. 9 is a flow chart showing a control routine executed by the ADS-ECU in the compulsory auto-light control of the second embodiment.
Figure 10:
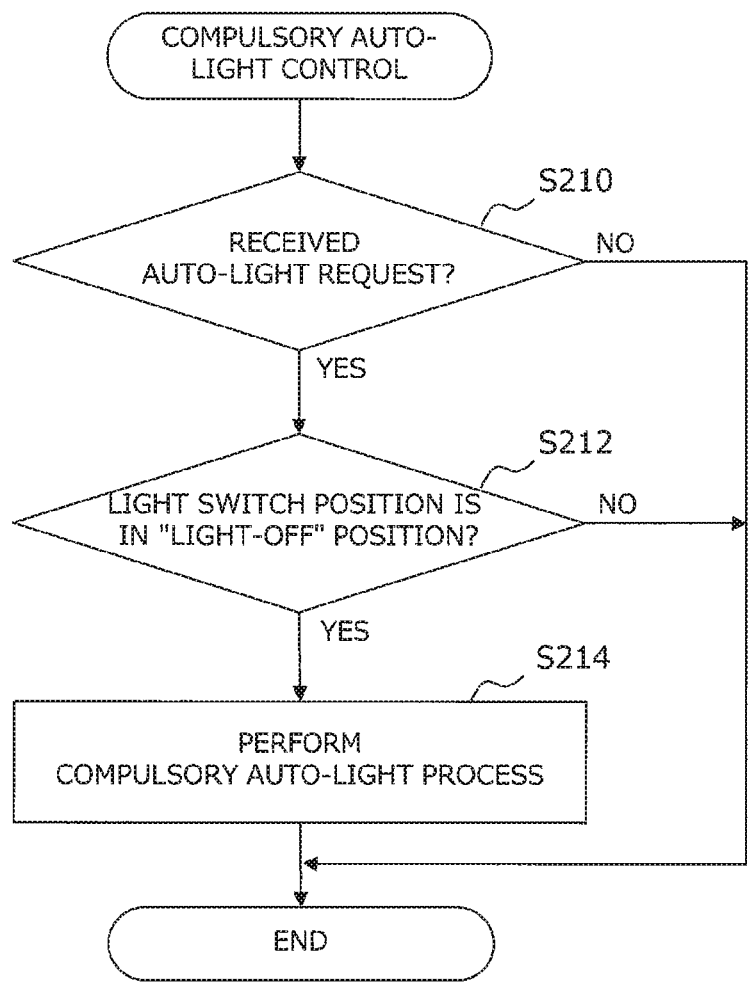
FIG. 10 is a flow chart of a control routine executed by the BODY-ECU in the compulsory auto-light control of the second embodiment.

FIG. 9 is a flow chart showing a control routine executed by the ADS-ECU in the compulsory auto-light control. FIG. 10 is a flow chart of a control routine executed by the BODY-ECU in the compulsory auto-light control.

The routine shown in FIG. 9 is repeatedly executed in the consciousness level determination processing unit 32 of the ADS-ECU 30 at a predetermined control cycle while the vehicle M1 is traveling. Steps S200 to S206 of the routine shown in FIG. 9 is the same as the processes of steps S100 to S106 shown in FIG. 6. When the process of step S204 is performed, the ADS-ECU 30 then transmits an auto-light request to the BODY-ECU 50 (step S208). When the process of step S208 or S206 is completed, the control routine is terminated.

The routine shown in FIG. 10 is repeatedly executed in the compulsory auto-light processing unit 54 of the BODY-ECU 50 at a predetermined control cycle while the vehicle M1 is traveling. First, in step S210, the BODY-ECU 50 determines whether an auto-light request has been received from the ADS-ECU 30. As a result, if the determination is not established (NO in step S210), the control routine is terminated. On the other hand, if the determination is successful (YES in step S210), the BODY-ECU 50 determines whether or not the light switch position is in the "light-off position" (step S212). Here, the BODY-ECU 50 determines whether or not the light-off signal is inputted from the light switch 82. As a result, if the determination is not satisfied (NO in step S212), it is determined that the light switch position is in the "light-on position" or the "auto-light position" and the headlight 72 is turned on in the dark, and the control routine is terminated. On the other hand, if the determination is successful (YES in step S212), the BODY-ECU 50 compulsorily executes the auto-light process for turning on or off the headlight 72 in accordance with the luminance information (step S214). When the process of step S214 is completed, this routine is terminated.

As described above, according to the vehicle control system of the second embodiment, the vehicle control system may compulsorily perform the auto-light process by the cooperation between the ADS-ECU 30 and the BODY-ECU 50. As a result, it is possible to avoid a problem in the evacuation traveling control because the headlight 72 does not light up in a dark place.

2-4. Modified Examples

The vehicle control system of the second embodiment may adopt a modified embodiment as described below.

In the vehicle control system of the second embodiment, the specific operation rejection control executed in the vehicle control system 100 of the first embodiment may be executed together with the compulsory auto-light control.

3. Third Embodiment

Next, the vehicle control system according to the third embodiment will be described with reference to the drawings.

3-1. Configuration of Vehicle Control System According to Third Embodiment

The configuration of the vehicle control system according to third embodiment is the same as that of the vehicle control system 100 of the first embodiment shown in FIG. 1. The detailed configuration of the vehicle control system according to the third embodiment is omitted.

3-2. Characteristic Functions of Vehicle Control System According to Third Embodiment When the consciousness level of the driver of the vehicle M1 decreases, the light switch position of the light switch 82 may be in the "light-off position" or the "auto-light position". If the evacuation traveling is performed in the state where the light switch position is in the "light-off position", it may be difficult to secure the visibility when passing through a dark place such as a tunnel or the like or when the day falls and becomes dark thereafter. In this case, the sensors necessary for the evacuation may not function normally, and it may be difficult to safely evacuate the vehicle M1 to the shoulder by the automated driving. In addition, when the evacuation traveling is performed in the state where the light switch position is in the "auto-light position", the headlight 72 may not be turned on in a relatively bright place. However, there is no problem if the headlight 72 is constantly turned on during the evacuation traveling from the viewpoint of enhancing safety.

Figure 11:
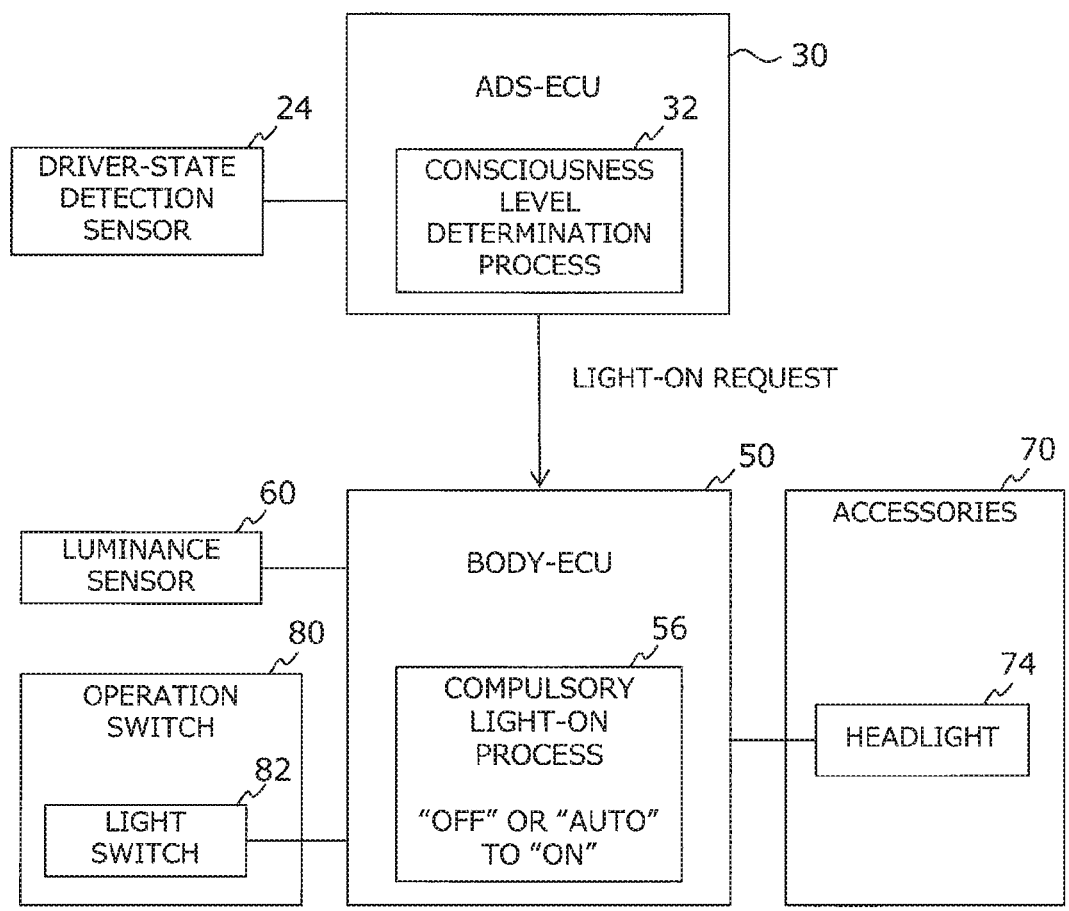
FIG. 11 is a functional block diagram of the vehicle control system for performing the compulsory light-on control according to a third embodiment.

In the vehicle control system according to the third embodiment, when the consciousness level of the driver is lowered and the light switch position is in the "light-off position" or the "auto-light position", the compulsory light-on control for compulsory turning on the headlight 72 is performed. FIG. 11 is a functional block diagram of the vehicle control system for performing the compulsory light-on control. As shown in the drawing, the ADS-ECU 30 includes the above-described consciousness level determination processing unit 32. The BODY-ECU 50 includes a light-on processing unit 56. The compulsory light-on control is performed by the cooperation between the ADS-ECU 30 and the BODY-ECU 50. Hereinafter, the specific process of the compulsory light-on control executed in the vehicle control system according to the third embodiment will be described with reference to the flowchart.

3-3. Specifically Process of the Compulsory Light-on Control

Figure 12:
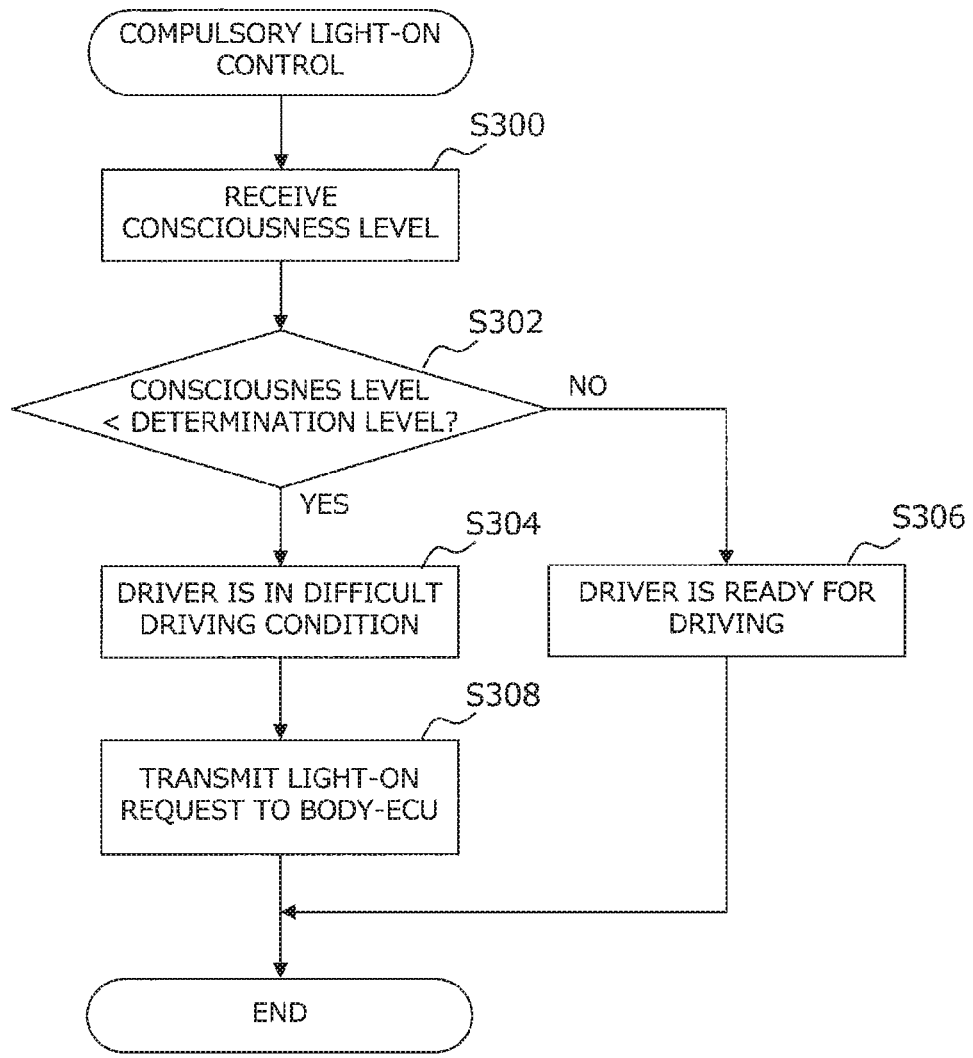
FIG. 12 is a flow chart showing a control routine executed by the ADS-ECU in the compulsory light-on control of the third embodiment.
Figure 13:
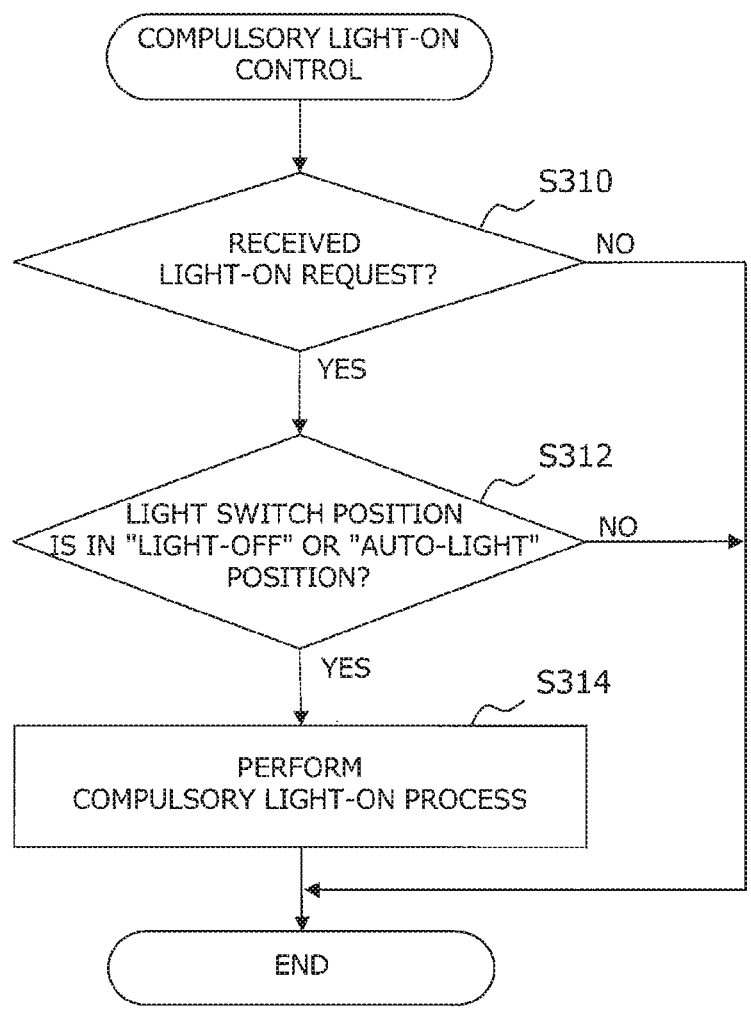
FIG. 13 is a flow chart of control routine executed by the BODY-ECU in the compulsory light-on control of the third embodiment.

FIG. 12 is a flow chart showing a control routine executed by the ADS-ECU in the compulsory light-on control. FIG. 13 is a flow chart of a control routine executed by the BODY-ECU in the compulsory light-on control.

The routine shown in FIG. 12 is repeatedly executed in the consciousness level determination processing unit 32 of the ADS-ECU 30 at a predetermined control cycle while the vehicle M1 is traveling. Steps S300 to S306 of the routine shown in FIG. 12 is the same as the processes of steps S100 to S106 shown in FIG. 6. When the process of step S304 is performed, the ADS-ECU 30 transmits a light-on request to the BODY-ECU 50 (step S308). When the process of step S308 or S306 is completed, the control routine is terminated.

The routine shown in FIG. 13 is repeatedly executed in the light-on processing unit 56 of the BODY-ECU 50 at a predetermined control cycle while the vehicle M1 is traveling. First, in step S310, the BODY-ECU 50 determines whether a light-on request has been received from the ADS-ECU 30. As a result, if the determination is not established (NO in step S310), the control routine is terminated. On the other hand, if the determination is successful (YES in step S310), the BODY-ECU 50 determines whether or not the light switch position is in the "light-off position" or the "auto-light position" (step S312). Here, the BODY-ECU 50 determines whether or not a light-off signal or an auto-light signal is inputted from the light switch 82. As a result, if the determination is not established (NO in step S312), the light switch position is in the "light-on position" and the headlight 72 is already constantly turned on, so that the present control routine is terminated. On the other hand, if the determination is successful (YES in step S312), the BODY-ECU 50 executes a compulsory light-on process for compulsorily turning on the headlight 72 at all times (step S314). When the process of step S314 is completed, the present control routine is terminated.

As described above, according to the vehicle control system of the third embodiment, the compulsory light-on control may be performed by the cooperation between the ADS-ECU 30 and the BODY-ECU 50. As a result, it is possible to prevent the safety of the evacuation traveling control from being hindered because the headlight 72 is not turned on.

3-4. Modified Examples

The vehicle control system according to the third embodiment may adopt a modified embodiment as described below.

In the vehicle control system of the third embodiment, the specific operation rejection control executed in the vehicle control system 100 of the first embodiment may be executed together with the compulsory light-on control.

4. Forth Embodiment

Next, the vehicle control system of the fourth embodiment will be described with reference to the drawings.

4-1. Configuration of Vehicle Control System according to Fourth Embodiment

The configuration of the vehicle control system according to forth embodiment is the same as that of the vehicle control system 100 of the first embodiment shown in FIG. 1. The detailed configuration of the vehicle control system according to the fourth embodiment is omitted.

4-2. Characteristic Functions of Vehicle Control System According to Fourth Embodiment When the consciousness level of the driver of the vehicle M1 decreases, the wiper switch position of the wiper switch 84 may be in the "wiper-off position". If the evacuation traveling is performed in the state where the wiper switch position is in the "wiper-off position", it may be difficult to secure visibility when rain starts to swing or when the windshield becomes dirty. In this case, the sensors necessary for the evacuation may not function normally, and it may be difficult to safely evacuate the vehicle M1 to the shoulder by the automated driving. Further, when the evacuation traveling is performed in the state where the wiper switch position is in the "wiper-on position", the wiping operation is continued even in a situation where the wiping operation is unnecessary, such as a case where rain stops thereafter or a case where the wiper switch position travels in the tunnel. When the wiping operation is performed, the windshield wiper 74 crosses the imaging range of the camera 12 or the like attached to the upper portion of the windshield. Since data is not available while the windshield wiper 74 is crossing these imaging scopes, there is a request to reduce unnecessary wiping operations as much as possible.

Figure 14:
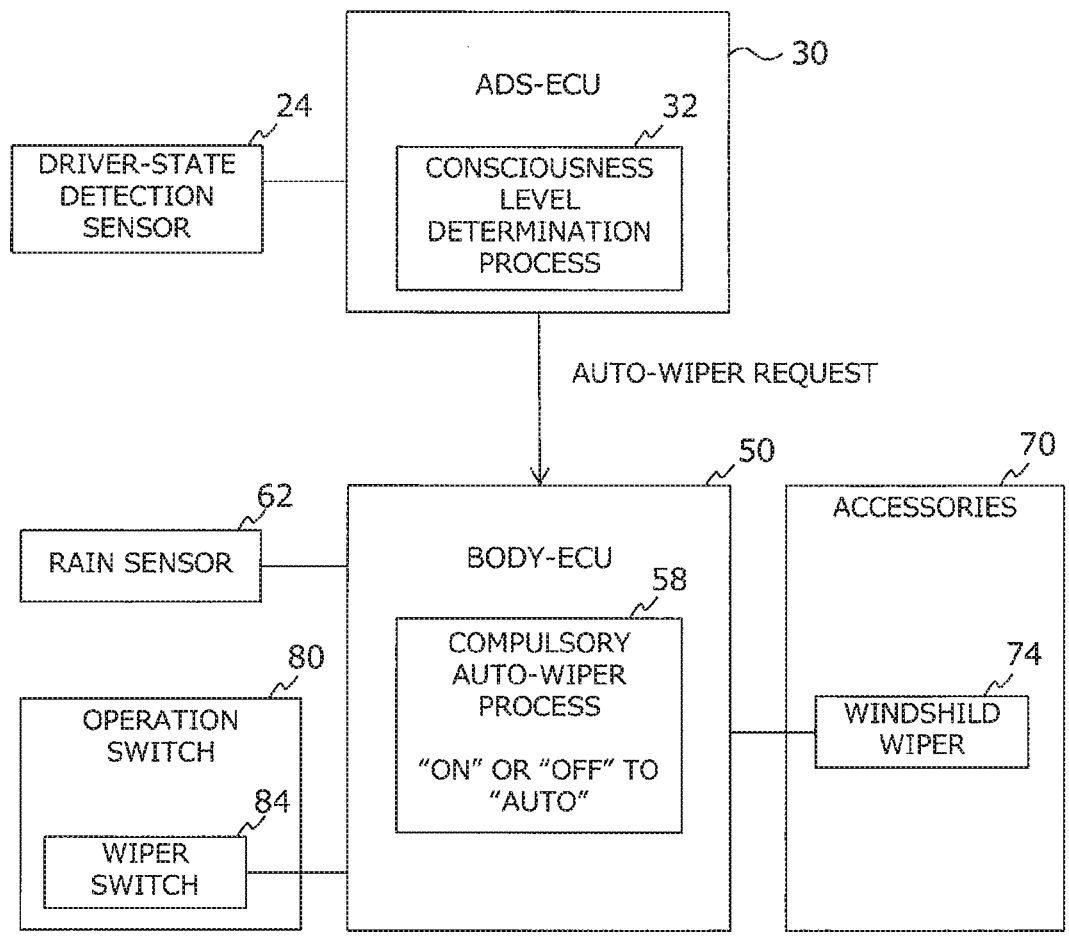
FIG. 14 is a functional block diagram of the vehicle control system for performing compulsory auto-wiper control according to a fourth embodiment.

In the vehicle control system according to the fourth embodiment, when the consciousness level of the driver is lowered and the wiper switch position is in the "wiper-off position" or the "wiper-on position", a compulsory auto-wiper control compulsory performing the auto-wiper process. FIG. 14 is a functional block diagram of the vehicle control system for performing the compulsory auto-wiper control. As shown in the drawing, the ADS-ECU 30 includes the above-described consciousness level determination processing unit 32. The BODY-ECU 50 includes an auto-wiper processing unit 58. The compulsory auto-wiper control is performed by the cooperation of the ADS-ECU 30 and the BODY-ECU 50. Hereinafter, a specific process of the compulsory auto-wiper control executed by the vehicle control system according to the fourth embodiment will be described with reference to a flowchart.

4-3. Specifically Process of Compulsory Auto-Wiper Control

Figure 15:
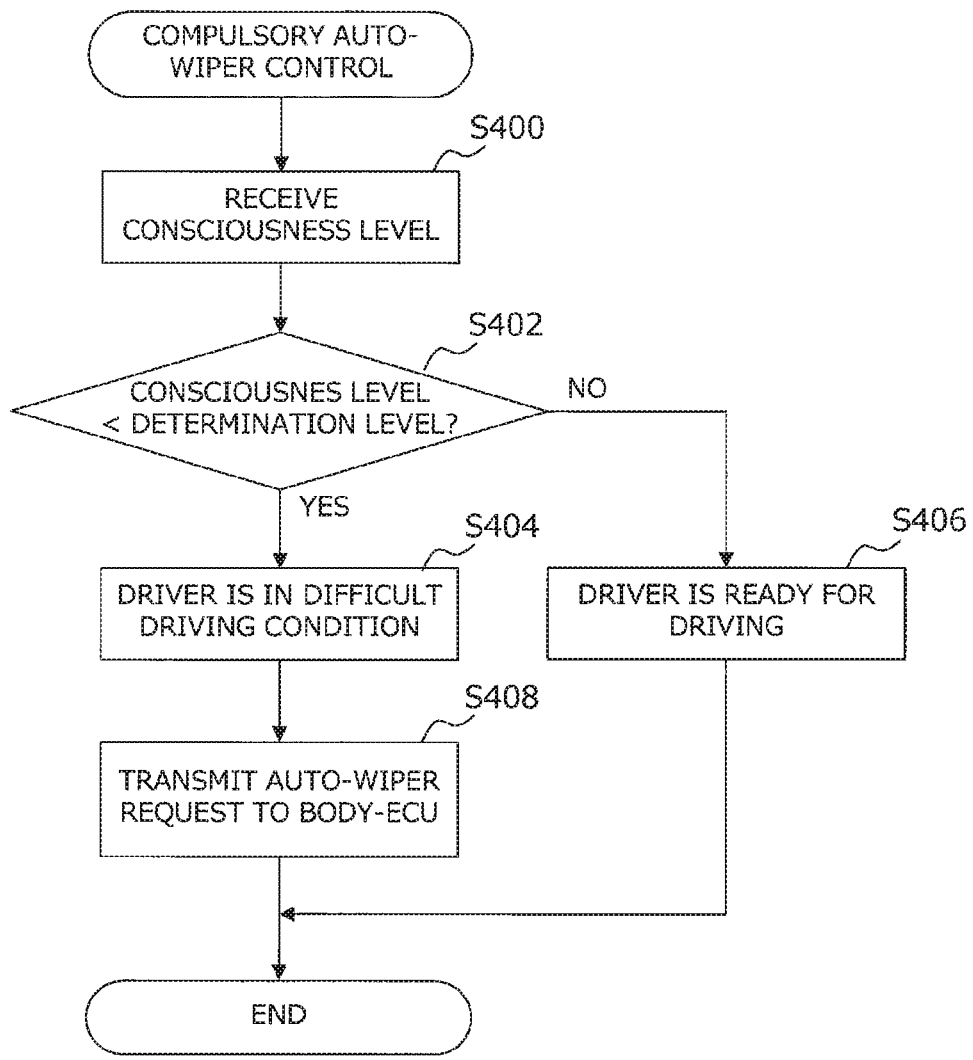
FIG. 15 is a flow chart showing a control routine executed by the ADS-ECU in the compulsory auto-wiper control according to the fourth embodiment.
Figure 16:
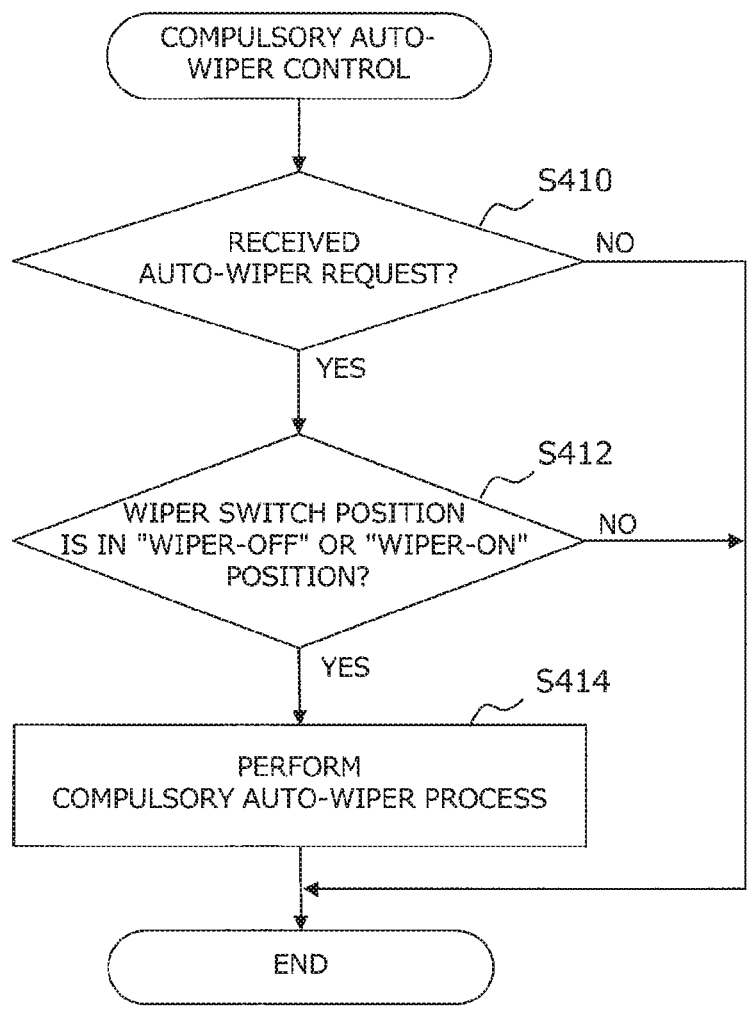
FIG. 16 is a flow chart of a control routine executed by the BODY-ECU in the compulsory auto-wiper control according to the fourth embodiment.

FIG. 15 is a flow chart showing a control routine executed by the ADS-ECU in the compulsory auto-wiper control. FIG. 16 is a flow chart of a control routine executed by the BODY-ECU in the compulsory auto-wiper control.

The routine shown in FIG. 15 is repeatedly executed in the consciousness level determination processing unit 32 of the ADS-ECU 30 at a predetermined control cycle while the vehicle M1 is traveling. Steps S400 to S406 of the routine shown in FIG. 15 is the same as the processes of steps S100 to S106 shown in FIG. 6. Once step S404 has been processed, then the ADS-ECU 30 sends an auto-wiper request to the BODY-ECU 50 (step S408). When the process of step S408 or S406 is completed, the control routine is terminated.

The routine shown in FIG. 16 is repeatedly executed by the auto-wiper processing unit 58 of the BODY-ECU 50 at a predetermined control cycle while the vehicle M1 is traveling. First, in step S410, the BODY-ECU 50 determines whether the auto wiper request has been received from the ADS-ECU 30. As a result, if the determination is not established, the control routine is terminated. On the other hand, if the determination is successful, the BODY-ECU 50 determines whether or not the wiper switch position is in the "wiper-on position" or the "wiper-off position" (step S412). Here, the BODY-ECU 50 determines whether or not the wiper-off signal or the wiper-on signal is inputted from the wiper switch 84. As a result, if the determination is not established, the wiper switch position is in the "auto-wiper position" and the auto-wiper process has already been executed, so that the present control routine is terminated. On the other hand, if the determination is successful, the BODY-ECU 50 executes the compulsory auto-wiper process for compulsorily performing the auto-wiper process (step S414). When the process of step S414 is completed, the present routine is terminated.

As described above, according to the vehicle control system of the fourth embodiment, the compulsory auto-wiper control during the evacuation traveling control may be performed by the cooperation between the ADS-ECU 30 and the BODY-ECU 50. As a result, it is possible to prevent the visibility from the windshield from deteriorating and to prevent the safety of the evacuation traveling control from being hindered.

4-4. Modified Examples

The vehicle control system of the fourth embodiment may adopt a modified embodiment as described below.

In the vehicle control system of the fourth embodiment, the specific operation rejection control executed in the vehicle control system 100 of the first embodiment may be executed together with the compulsory auto-wiper control.

In the vehicle control system of the fourth embodiment, the compulsory auto-light control executed in the vehicle control system of the second embodiment or the compulsory light-on control executed in the vehicle control system of the third embodiment may be executed together with the compulsory auto-wiper control.

What is claimed is:

1. A vehicle control system installed on a vehicle, the vehicle including an operation switch for manually operating an operation state of accessories to at least one of an on position and an off position installed on a body, the system comprising:
    a first controller configured to execute automated driving of the vehicle, and to perform an evacuation traveling for automated evacuating and stopping the vehicle when a consciousness level of a driver is lower than a predetermined determination value; and
    a second controller configured to control the operation state of the accessories based on a request from the first controller or operation information of the operation switch,
    wherein the first controller is configured to transmit a specific operation rejection request to the second controller for performing a specific operation rejection process for rejecting a control of the accessories operated by the driver based on the manual specific operation of the operation switch and to maintain or switch the accessories to the on position thereof when the consciousness level of the driver is lower than a predetermined determination value,
    wherein the second controller is configured to control the specific operation rejection process when the specific operation rejection request is received from the first controller.

2. The vehicle control system according to claim 1,
    wherein the accessories includes a headlight,
    wherein the operation switch includes a light switch including a light-on position for turning on the headlight and a light-off position for turning off the headlight,
    wherein the specific operation includes an operation of the light switch to the light-off position.

3. The vehicle control system according to claim 2,
wherein the light switch further includes an auto-light position for performing an auto-light process for automatically switching the operation state of the headlight in accordance with an external environment,
wherein the first controller is configured to transmit an auto-light request for performing the auto-light process to the second controller when the consciousness level of the driver is lower than a predetermined determination value,
wherein the second controller is configured to perform the auto-light process when the auto-light request is received from the first controller in a state where the light switch is operated to the light-off position.

4. The vehicle control system according to claim 2,
wherein the first controller is configured to transmit a light-on request for turning on the headlight to the second controller when the consciousness level of the driver is lower than a predetermined determination value,
wherein the second controller is configured to turn on the headlight when the light-on request is received from the first controller in a state where the light switch is operated in a position different from the light-on position.

5. The vehicle control system according to claim 1,
wherein the accessories includes a wiper,
wherein the operation switch includes a wiper switch including a wiper-on position for driving the wiper and a wiper-off position for stopping the wiper,
wherein the specific operation includes operating the wiper switch to the wiper-off position.

6. The vehicle control system according to claim 5,
wherein the wiper switch further includes an auto-wiper position for performing an auto-wiper process for automated switching an operating state of the wiper according to an external environment,
wherein the first controller is configured to transmit an auto-wiper request for performing the auto-wiper process to the second controller when the consciousness level of the driver is lower than a predetermined determination value,
wherein the second controller is configured to perform the auto-wiper process when the auto-wiper request is received from the first controller in a state where the wiper switch is operated to the wiper-off position or the wiper-on position.

7. The vehicle control system according to claim 1,
wherein the accessories include a direction indicator,
wherein the operation switch includes a direction indicator switch for switching the lighting state of the direction indicator,
wherein the specifying operation includes an operation of the direction indicator switch.

8. The vehicle control system according to claim 1, further comprising a driver-state detection sensor which detects the consciousness level of the driver based on at least one of a heartbeat state and a breathing state of the driver.

9. The vehicle control system according to claim 1, wherein the vehicle is stopped at a road shoulder.

* * * * *